(12) United States Patent
Speake et al.

(10) Patent No.: US 8,253,943 B2
(45) Date of Patent: Aug. 28, 2012

(54) INTERFEROMETER

(75) Inventors: Clive C. Speake, Birmingham (GB); Stuart M. Aston, Dudley (GB); Fabian Erasmo Pena Arellano, Merida (MX); Timothy P. Copland, Coventry (GB)

(73) Assignee: The University of Birmingham, University Road West, Edgbaston (GB)

( * ) Notice: Subject to any disclaimer, the term of this patent is extended or adjusted under 35 U.S.C. 154(b) by 188 days.

(21) Appl. No.: 12/669,006

(22) PCT Filed: Jul. 17, 2008

(86) PCT No.: PCT/GB2008/002437
§ 371 (c)(1),
(2), (4) Date: Jun. 11, 2010

(87) PCT Pub. No.: WO2009/010750
PCT Pub. Date: Jan. 22, 2009

(65) Prior Publication Data
US 2010/0238456 A1    Sep. 23, 2010

(30) Foreign Application Priority Data

Jul. 18, 2007  (GB) .................................. 0713982.7

(51) Int. Cl.
*G01B 9/02*    (2006.01)
(52) U.S. Cl. ........................................................ 356/450
(58) Field of Classification Search .................. None
See application file for complete search history.

(56) References Cited

U.S. PATENT DOCUMENTS

| 3,832,063 | A  | * | 8/1974 | Matsumoto et al. | .......... 356/508 |
| 4,534,649 | A  | * | 8/1985 | Downs | .......................... 356/495 |
| 7,580,133 | B2 | * | 8/2009 | Ueki et al. | .................... 356/511 |

* cited by examiner

*Primary Examiner* — Tu Nguyen
(74) *Attorney, Agent, or Firm* — Goodwin Procter LLP

(57) ABSTRACT

An interferometer includes a source of a light beam and a beam splitter for splitting the light beam from the source into at least first and second beams. A first reflector is positioned in the path of the first light beam. A second reflector, including a convergent lens and a mirror, is positioned in the path of the second light beam following reflection from a target. Further included is at least one detector for detecting fringes formed by interference of the first and second light beams following reflection from the first and second reflectors, respectively. The mirror of the second reflector has a radius of curvature R within 10% of the value determined using a first formula, and the focal length f of the convergent lens is within 10% of the value determined using a second formula.

13 Claims, 7 Drawing Sheets

A: Spherical
B: Coma
C: Astigmatism
D: Field Curvature
E: Distortion

INTERFEROMETER

RELATED APPLICATIONS

This application is a U.S. National Stage of International Application Serial No. PCT/GB2008/002437, filed Jul. 17, 2008, and claims priority to United Kingdom Patent Application No. 0713982.7, filed Jul. 18, 2007, the disclosures of which are hereby incorporated by reference in their entireties.

CROSS-REFERENCE TO RELATED APPLICATIONS

This application is a U.S. National Stage of International. Application Serial No. PCT/GB2008/002437, filed Jul. 17, 2008, and claims priority to United Kingdom Patent Application No. 0713982.7, filed Jul. 18, 2007, the disclosures of which are hereby incorporated by reference in their entireties.

STATEMENT REGARDING FEDERALLY SPONSORED RESEARCH/DEVELOPMENT

Not applicable

THE NAMES OF THE PARTIES TO A JOINT RESEARCH AGREEMENT

Not Applicable

INCORPORATION-BY-REFERENCE OF MATERIAL SUBMITTED ON COMPACT DISC

Not Applicable

BACKGROUND OF THE INVENTION (1) Field of the Invention

The present invention relates to the field of interferometry.

(2) Description of Related Art

Interferometers are devices that measure the interference pattern produced by the superposition of two or more waves, such as those of electromagnetic radiation. Interferometers can be used, in particular, for the accurate measurement of changes in distance (resolution of up to 1 pm is possible in some cases, with a 1 second averaging time).

In the standard (Michelson) design of interferometer, a beam of light from a light source is split into two, by means of a beam splitter. One beam of light (the reference beam) is directed towards a reflector (which may be a plane mirror, or a retroreflector such as a cube corner) housed within the interferometer, whilst the other is directed towards a reflector on the target. Following reflection of the two beams from the respective reflectors, the beams of light are recombined, and the resulting interference measured by a detector. Since the reference reflector is held at a fixed position relative to the beamsplitter whilst the target reflector is separate from the interferometer, any movement of the target relative to the interferometer will change the interference pattern in a predictable manner, allowing changes in the relative distance between the interferometer and target to be calculated. In modern devices, the beam of light frequently has a high degree of coherence, such as a light beam from a laser device.

One modern development of a Michelson interferometer is described in Class. Quantum Gray., vol. 22 (2005), pages 1-9. Another such device is sold by Canon, Inc. under the DS-80 model name.

One problem with these prior art designs is that, in order to function correctly, the target reflector must be correctly aligned with the axis of the light beam, which generally means that the normal axis of the reflector should be coincident with the axis of the incident light beam. Thus, for example, in one embodiment, a misalignment of only 1 mrad of the target leads to a 2-fold reduction in fringe visibility. Although some divergence of these axes is possible for certain constructions, the tolerance for misalignment applies only over a narrow range of distances, and drops markedly if the distance from the interferometer to the target is outside this range. In the Canon model, the range over which the device can be used is about 50 μm.

Since the accuracy with which the target reflector can be oriented is frequently limited, the usefulness of any given interferometer is limited to measuring changes in distance within this narrow range. Thus, different configurations of interferometer are required for different applications, according to the distance to be measured. Furthermore, increasing the usable distance of the interferometer may also require other dimensions to be increased, such that the device becomes large and unwieldy.

It is possible to use a retroreflector as the target reflector, in which case the tolerance for misalignment of the reflector is increased. Retroreflectors are optical devices which are able to reflect a beam of light in a direction parallel with the incident beam, even where that incident beam is not axially aligned with the reflector. Common retroreflectors include half-silvered glass spheres, and corner-cube reflectors. However, it is not always practical to mount retroreflectors on the target. For example, where the target is very low in mass, the additional mass of the retroreflector may significantly alter the dynamic properties of the target. Where it is desired to measure distances of a large number of similar or identical components (e.g. on a production line) it may be impractical to apply retroreflectors to each individual component. Furthermore, although the light beam reflected from a retroreflector may be parallel with the incident beam, it will usually be laterally displaced from the incident beam axis, due to translation within the retroreflector. This reduces the degree of overlap and hence the visibility of interference fringes within the interferometer.

It is therefore desirable to have an interferometer for measuring distance with increased tolerance for axial misalignment.

BRIEF SUMMARY OF THE INVENTION

According to the present invention, there is provided an interferometer comprising: a source of a light beam; a first beam splitter for splitting the light beam from the source into at least first and second beams; a first (reference) reflector positioned in the path of the first light beam; a second reflector, comprising a convergent lens and a mirror, positioned in the path of the second light beam following reflection from a target; and at least one detector for detecting fringes formed by interference of the first and second light beams following reflection from the first and second reflectors respectively; characterised in that the mirror of the second reflector has a radius of curvature R within 10% of the value determined using the formula:

$$R = \frac{\left(\sum_i \frac{l_i}{n_i}\right)^2}{\sum_i \frac{l_i}{n_i} - \sum_k \frac{l_k}{n_k}}$$

and the focal length f of the convergent lens is within 10% of the value determined using the formula:

$$f = \sum_i \frac{l_i}{n_i}$$

where i are the segments of optical path, each of length $l_i$ and having refractive index $n_i$, between the convergent lens and the mirror, and k are the segments of the intended optical path, each of length $l_k$ and having refractive index $n_k$, between the convergent lens and the target, in use.

It will be readily understood by the skilled man that the second reflector acts as a retroreflector (a 'cats-eye'), and that the focal length f of the convergent lens defines a 'sweet spot' for location of the target mirror, at which the tolerance of the interferometer to tilt of the target mirror is maximised.

It will be readily understood by the skilled man that a light source for use in an interferometer must produce light with sufficient coherence to enable the first and second light beams to produce adequately visible fringes. The coherence length L of a light source may be related to the range of wavelengths $\Delta\lambda$ produced by the light source according to the equation:

$$L = \frac{\lambda^2}{\Delta\lambda}$$

In certain embodiments of the present invention, the coherence length required is of the order of 50 cm, which is easily achieved using a diode laser as the light source.

As used herein, the term "mirror" in relation to the second reflector is not limited to silvered glass, but refers to any device having a reflective surface whose geometry can be configured according to the equation given above. It may also be constructed as a combination of a lens adjacent to a plane mirror, such that the combination has equivalent optical properties to a mirror of the required geometry. For example, a mirror with curvature R can be replaced by a lens of focal length R/2 adjacent to a plane mirror.

As used herein, the term "convergent lens" may refer to a simple or a compound lens. Where the convergent lens is a compound lens, it may include elements which are individually divergent in nature, provided that the lens as a whole is convergent. For example, a compound lens may be used to counter the effects of spherical aberration, with a positive lens paired with a negative lens made from a different material. Additionally or alternatively, aspheric lenses may be used.

The design of the mirror of the second reflector is dependent on a particular value for the total optical path length to the target, and so it is expected that the interferometer will be placed, in use, at the correct distance from the target to allow this.

As used herein, the radius of curvature R of the mirror is assessed from the direction of the light beam(s) approaching the reflective face thereof, such that a positive (finite) value of R indicates a concave (convergent) mirror, whilst a negative (finite) value of R indicates a convex (divergent) mirror.

It is thought that the combination of the convergent lens and mirror having the required geometry causes the second beam of light reflected from the target, which may be slightly displaced from the incident axis due to misalignment of the target, to be brought more into alignment with this axis. Thus, the effects of the misalignment are reduced, and hence the device has a greater tolerance for misalignment of the target.

In some embodiments, the first reflector comprises a plane mirror.

In some embodiments, the radius R of the mirror of the second reflector, and/or the focal length f of the convergent lens of the second reflector, may be within 5% of the values calculated using the formulae above. In some further embodiments, either or both of these properties may be within 2% of the calculated values.

In some embodiments, the position of the second reflector is such that the optical path of the second light beam includes a second reflection from the target, following reflection from the second reflector.

In some embodiments, the second reflector is additionally positioned in the path of the first light beam, following reflection from the first reflector. In a further embodiment, the position of the second reflector is such that the optical path of the first light beam includes a second reflection from the first reflector, following reflection from the second reflector.

In cases where the mirror of the second reflector is a plane mirror (i.e. R=∞), the optical path lengths $$\sum_i \frac{l_i}{n_i} \text{ and } \sum_k \frac{l_k}{n_k}$$

should be equal. Since it may also be desirable for the target path length $$\sum_k \frac{l_k}{n_k}$$

to be as large as possible (to maximise the practical applications of the interferometer by allowing the device to be placed at some distance from the target), the necessary corresponding increase in the focal path length $$\sum_i \frac{l_i}{n_i}$$

will therefore lead to an increase in dimensions of the interferometer.

In some embodiments, therefore, the optical path length from the convergent lens to the mirror, $$\sum_i \frac{l_i}{n_i},$$

is less than the target path length, $$\sum_k \frac{l_k}{n_k}.$$

This leads to the required mirror of the second reflector being convex in shape (negative R), and allows for the interferometer to be more compact in size.

In a first series of embodiments, the components of the interferometer are positioned such that the optical path of the second light beam passes through the first beam splitter (with or without reflection) following reflection from the target and before reflection from the mirror of the second reflector, and the convergent lens of the second reflector is positioned between the first beam splitter and the mirror of the second reflector.

In a second series of embodiments, the components of the interferometer are positioned such that the optical paths of both the first and second light beams pass through the first beam splitter (with or without reflection) following reflection from the first reflector and target respectively and before reflection from the mirror of the second reflector, the convergent lens of the second reflector in the path of the second light beam being positioned between the first beam splitter and the target, the second reflector further comprising a second convergent lens positioned in the path of the first light beam between the first beam splitter and the reference reflector, and the interferometer further comprising a divergent lens positioned between the light source and the first beam splitter.

Positioning of the convergent lens (in the path of the second light beam) closer to the target, as in the second series of embodiments (relative to the first series of embodiments), increases the required focal path length (assuming that the position of the mirror remains constant), thereby allowing the target path length to be increased and the curvature of the convergent lens to be reduced.

In one embodiment of the second series where the convergent lens of the second reflector is a compound lens, one or more elements of the convergent lens are positioned between the beam splitter and the target, and one or more elements of the convergent lens are positioned between the beam splitter and the mirror of the second reflector. Splitting the elements of the convergent lens in this manner allows some increase in target path length (and reduction in curvature) whilst maximising optical quality.

In the second series of embodiments, the divergent lens is necessary to prevent focusing of the first and second light beams before reflection from the reference reflector and target respectively.

In some embodiments, the first beam splitter is a polarising beam splitter such that the first and second light beams have complementary polarisations. For example, where the first and second light beams have circular polarisation, the first and second light beams may be polarised in opposite senses (i.e. right- and left-handed). Where the first and second light beams are plane polarised, the planes of polarisation may be orthogonal.

In some further embodiments, the first beam splitter is a plane polarising beam splitter, and the interferometer further includes a plane polariser located between the light source and the first beam splitter. The plane polariser should preferably be oriented relative to the beam splitter such that the first and second light beams have orthogonal planes of polarisation and approximately equal intensity. The use of complementarily-polarised light beams allows the beams to be manipulated independently, even after passing through the same physical space. However, this increases the need to reduce the curvature of the convergent lens in the second reflector, since highly curved lenses can produce different effects with light beams of different polarisations. In particular, one light beam might be more prone to reflection from a surface of the lens, whilst the light beam with the corresponding polarisation is allowed to pass through the lens.

In some embodiments, the interferometer comprises at least two detectors for detecting fringes formed by interference of the first and second light beams following reflection from the first and second reflectors respectively. In some further embodiments, the interferometer further comprises a quarter-wave ($\lambda/4$) plate present in the optical pathway to at least one of the detectors but absent from the optical pathway to at least one of the other detectors. Comparison of the signals obtained with and without the quarter-wave plate in the pathway allows a more accurate determination of the relative phases of the first and second light beams.

In some further embodiments, the interferometer comprises at least three detectors for detecting fringes formed by interference of the first and second light beams following reflection from the first and second reflectors respectively, and further comprises a second polarising beam splitter present in the optical pathway to at least two of the detectors but absent from the optical pathway to at least one of the other detectors, at least two of the at least two detectors being arranged to record fringes at each of the two outputs of the second beam splitter. This arrangement provides a more effective means to account for changes in the input power from the light source.

In some embodiments, the interferometer further includes a reference detector for measurement of the intensity of the light beam from the source before passing through the first beam splitter. The interferometer may further include a third beam splitter (which may be non-polarising) for directing a portion of the light beam from the source to the reference detector. This allows any variation in the output of the light beam source to be taken into account.

BRIEF DESCRIPTION OF THE SEVERAL VIEWS OF THE DRAWINGS

Certain embodiments of the invention will now be described by way of example, with reference to the accompanying Figures, in which.

DETAILED DESCRIPTION OF THE INVENTION

Figure 1:
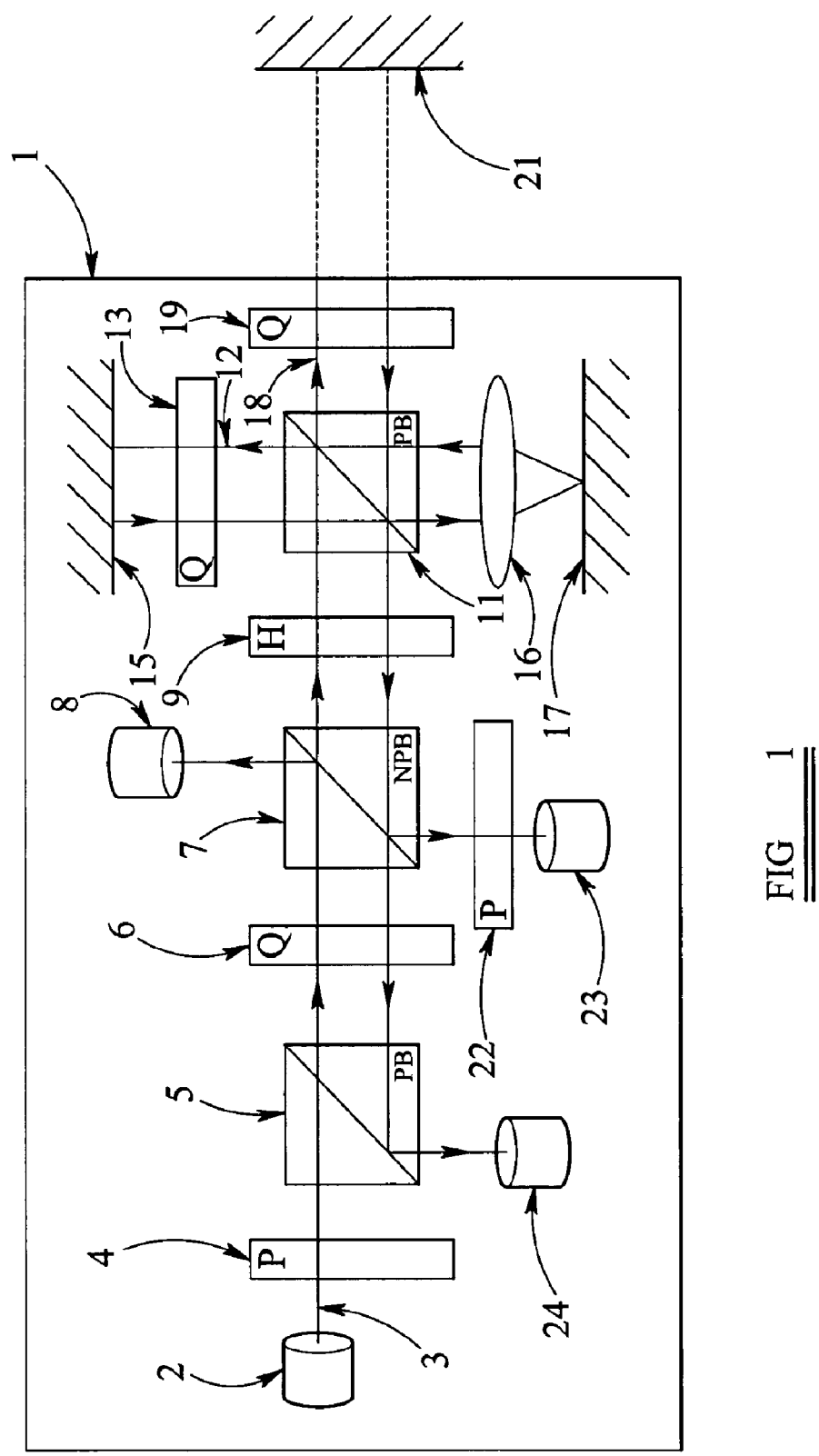
FIG. 1 represents a schematic diagram of one embodiment of an interferometer according to the present invention.

Referring to FIG. 1, an interferometer 1 is provided with a laser diode 2, such as a monomode VCSEL laser diode operating at approximately 850 nm. The laser light beam 3 produced by the diode 2 is then attenuated by a combination of a first polariser 4 and a first polarising beam splitter 5. It should be noted that the path shown for the laser light beam 3 is highly stylised and does not represent the actual path of the light beam in space; rather, it is intended simply to be a pictorial representation of the path of the laser light beam 3 between the components of the interferometer. In addition, neither the components of the interferometer nor the position of the target 21 relative to the interferometer 1 are shown to scale.

After passing through a first quarter-wave ($\lambda$/4) plate 6, the beam is split by a nonpolarising beam splitter 7. Part of the beam is thereby directed to a first detector 8, which records the intensity of the incident beam (following attenuation) emitted by the laser diode 2. The remainder of the beam 3 then passes through a half-wave ($\lambda$/2) plate 9 and enters a second polarising beam splitter 11. Here, the laser light beam 3 is split into two orthogonally plane-polarised components, namely a first light beam 12 and a second light beam 18.

The first light beam 12 is reflected by the second polarising beam splitter 11 through a second quarter-wave ($\lambda$/4) plate 13 towards a reference (plane) mirror 15. Following reflection from the reference mirror 15, the first light beam 12 again passes through the second quarter-wave ($\lambda$/4) plate 13 and re-enters the second polarising beam splitter 11. However, since the plane of polarisation of the first light beam has now been rotated through 90° by the two passes through the second quarter-wave (214) plate 13, it is now not reflected by the second polarising beam splitter 11 but passes straight through to a convergent lens 16.

The convergent lens 16 focuses the first light beam 12 onto a second mirror 17, and then returns the first light beam 12 to a collimated state following reflection from the second mirror 17. [Although second mirror 17 is drawn as a plane mirror for simplification, the curvature of this mirror is in fact determined according to the equation of claim 1. Thus, as drawn, the path length between the convergent lens 16 and the second mirror 17 is much shorter than the path length between the convergent lens 16 and the target 21, and so the second mirror should be convex (negative radius R).]

The first light beam 12 passes once again through the second polarising beam splitter 11 and the second quarter-wave ($\lambda$/4) plate 13, is reflected from the reference mirror 15, returns through the second quarter-wave ($\lambda$/4) plate 13 and re-enters the second polarising beam splitter 11. Since the plane of polarisation of the first light beam 12 has now been rotated a further 90° by two further passes through the second quarter-wave ($\lambda$/4) plate 13 (giving a total rotation of 180°), it is now reflected by the second polarising beam splitter 11 and exits the beam splitter, returning towards the half-wave ($\lambda$/2) plate 9.

The second light beam 18 passes straight through the second polarising beam splitter 11 and a third quarter-wave ($\lambda$/4) plate 19 towards a target 21. Following reflection from the target 21, the second light beam again passes though the third quarter-wave ($\lambda$/4) plate 19 and re-enters the second polarising beam splitter 11. As with the first light 5 beam 12, the two passes through the third quarter-wave ($\lambda$/4) plate 19 rotate the plane of polarisation of the second light beam 18 through 90° so that it is now reflected by the second polarising beam splitter 11 towards the convergent lens 16.

Similarly, the convergent lens 16 focuses the second light beam 18 onto the second mirror 17, and then returns the second light beam 18 to a collimated state following reflection from the second mirror 17. The second light beam 12 is then reflected once again by the second polarising beam splitter 11 and passes through the third quarter-wave ($\lambda$/4) plate 19, is reflected from the target 21, and passes again through the third quarter-wave ($\lambda$/4) plate 19 before re-entering the second polarising beam splitter 11. Again, the additional rotations by the third quarter-wave ($\lambda$/4) plate mean that the second light beam 18 now passes straight through the second polarising beam splitter 11, returning towards the half-wave ($\lambda$/2) plate 9, and rejoining the first light beam 12.

The recombined light beam 3 passes through the half-wave ($\lambda$/2) plate 9 and re-enters the non-polarising beam splitter 7, where it is split into two parts. The first part is reflected by the non-polarising beam splitter 7 via a second polariser 22 to a second detector 23, which measures the fringes produced by superposition of resolved components of the first and second light beams 12 and 18. The second part of the recombined light beam 3 passes through the non-polarising beam splitter 7 and the first 25 quarter-wave ($\lambda$/4) plate 6, and is attenuated and reflected by the first polarising beam splitter 5 towards a third detector 24. The third detector 24 also measures the fringes produced by supposition of resolved components of the first and second light beams 12 and 18, but the introduction of the first quarter-wave ($\lambda$/4) plate 6 into the path means that the measurements of the second and third detectors 23 and 24 are now complementary.

The interferometer configuration shown in FIG. 1 shows an increased tolerance to misalignment of the target reflector (increased by a factor of 10 compared to a typical prior art device). However, the compactness of such a device is limited by the focal length of the convergent lens, since the interferometer must allow the second mirror 17 to be placed at the correct distance (dependent on the focal length) from the convergent lens 16. In order to make the interferometer more compact, it is necessary to minimize this distance through the use of a lens with a shorter focal length.

However, as the focal length of the lens decreases, the lens itself must become more spherical in shape, leading to spherical aberration and hence to reduced signal quality at the detectors. Whilst it is possible to minimise spherical aberration by using aspheric lenses, such lenses are significantly more difficult (and hence expensive) to produce. Thus, it is desirable to be able to minimise the size of the interferometer whilst maximising the usable distance to the target, even using standard (spherical) lenses.

Figure 2:
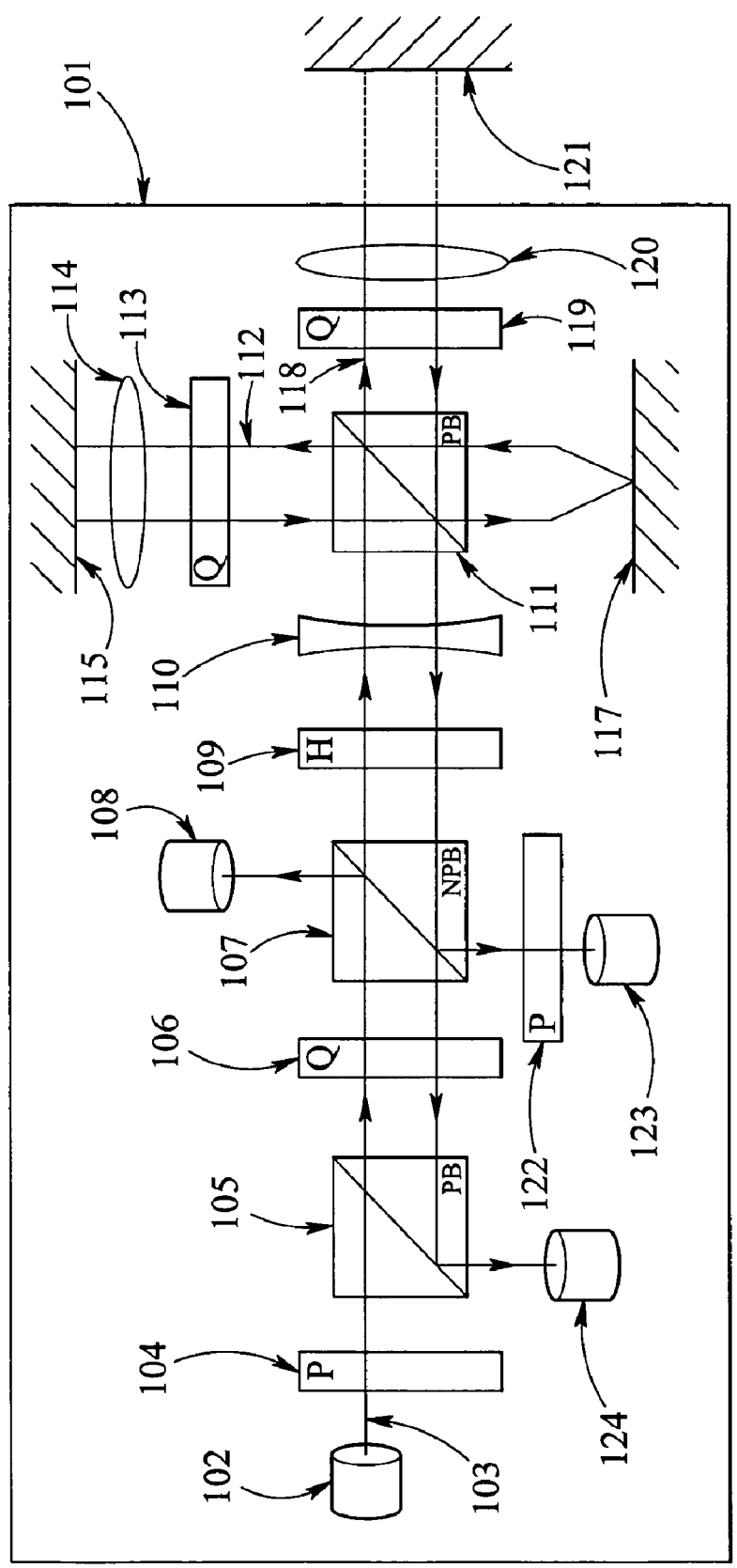
FIG. 2 represents a schematic diagram of a second embodiment of an interferometer according to the present invention.

Referring to FIG. 2, it can be seen that the interferometer 101 is similar in design to the interferometer 1 of FIG. 1. However, in the improved interferometer 101 of FIG. 2 there is no convergent lens between the second polarising beam splitter 111 and the second mirror 117. Instead, there is a first convergent lens 114 between the second quarter-wave ($\lambda$/4) plate 113 and the first mirror 115 (in the path of the first light beam 112), and a second convergent lens 120 between the third quarter-wave ($\lambda$/4) plate 119 and the target 121 (in the path of the second light beam 118). Additionally, there is a divergent lens 110 situated between the half-wave ($\lambda$/2) plate 109 and the second polarising beam splitter 111.

The divergent lens causes the initial laser light beam 103 to diverge before entering the second polarising beam splitter 111. The first and second light beams 112 and 118 therefore continue to diverge on leaving the second polarising beam splitter 111, before they reach the first and second convergent lenses 114 and 120 respectively. These convergent lenses act as collimating lenses, directing collimated light towards the reference mirror 115 and target 121 respectively. However, following reflection from the reference mirror 115 and the target 121, the first and second convergent lenses 114 and 120 cause the first and second light beams 112 and 118 to be focused on the second mirror 117, via the second polarising beam splitter 111.

Thus, in this embodiment, the focusing optical path length between the first and second convergent lenses 114 and 120 and the second mirror 117 is significantly longer then the focusing optical path length in the embodiment of FIG. 1. This allows for the use of a longer target optical path length (for a given curvature of the second mirror 117), and for convergent lenses having a lower degree of curvature (i.e. increased radius), in a compact apparatus.

Figure 3:
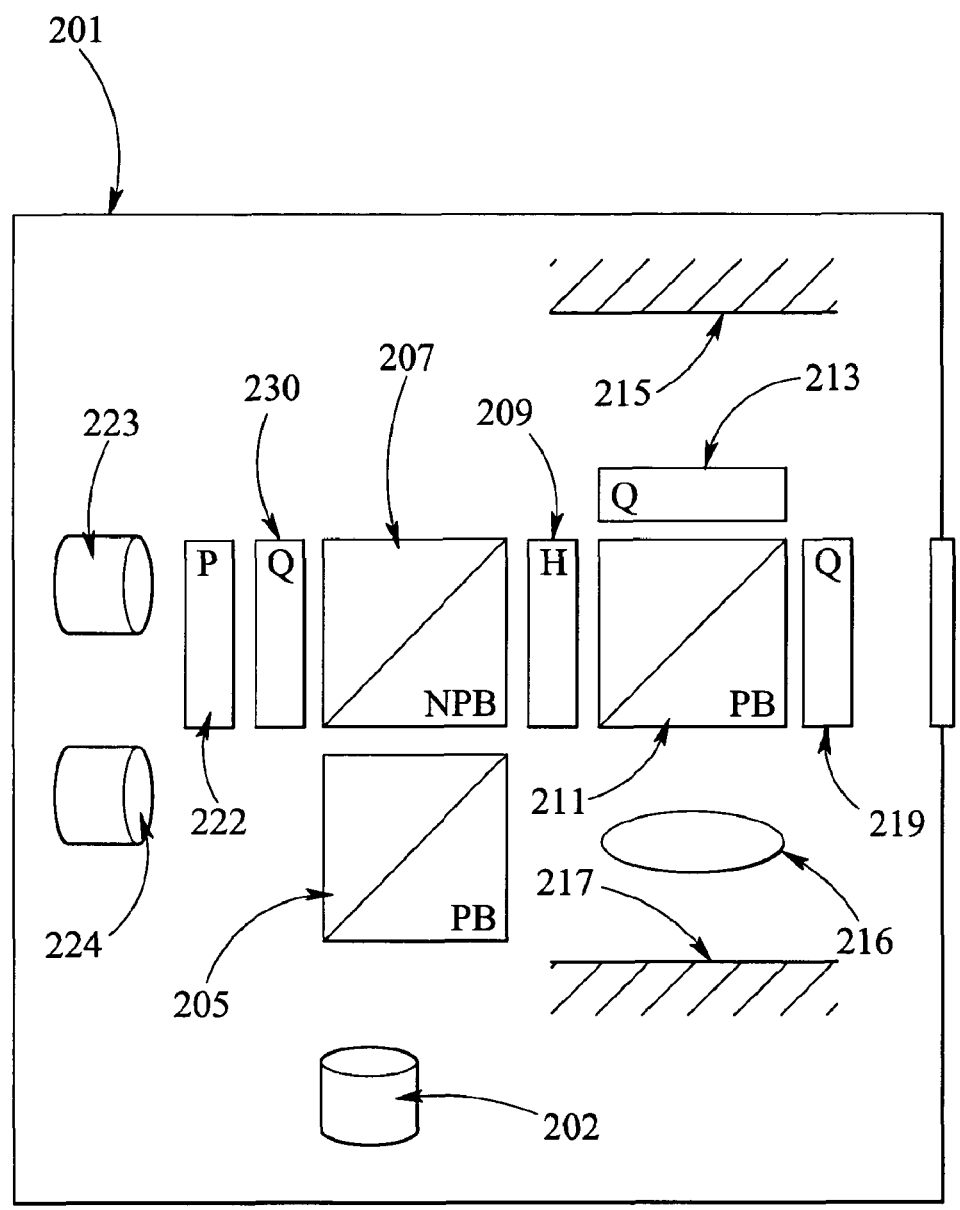
FIG. 3 represents a schematic diagram of a third embodiment of an interferometer according to the present invention.

Referring to FIG. 3, an interferometer 201 is provided with a VCSEL laser diode 202 producing a diverging Gaussian beam with a spectral width of about 100 MHz (with a coherence length of more than 1 m). This is collimated into a beam of width approximately 1 mm, using an aspheric lens (not shown).

The diode is located so that the laser beam emitted is offset from the axis of the interferometer. This prevents back reflections entering the laser cavity, which might otherwise cause instability in the wavelength and intensity of the output beam.

The polarisation of the laser beam is such that it is transmitted by a first polarising beam splitter 205. The beam is then partially deflected by a non-polarising beam splitter 207, with the transmitted beam being absorbed into a 'beam-dump' (not shown). The deflected beam passed through a half-wave ($\lambda/2$) plate 209, which rotates the plane of polarisation by 45 degrees.

A second polarising beam splitter 211 then couples approximately equal intensities of optical radiation into two arms of the interferometer. The first (reflected) beam passes through a first quarter-wave ($\lambda/4$) plate 213 towards a first, reference (plane) mirror 215, in the reference arm of the interferometer. Following reflection from the reference mirror 215, the first beam passes again through the first quarter-wave ($\lambda/4$) plate and reenters the second polarising beam splitter 211, through which it is now transmitted.

The second (p-polarisation) beam produced by the second polarising beam splitter 211 is transmitted into the measurement arm, and passes through a second quarter-wave ($\lambda/4$) plate 219 before being reflected by a target mirror, which is supplied by the user and not shown in the Figure. The light reflected from the target mirror passes once more through the second quarter-wave ($\lambda/4$) plate 219 and is subsequently reflected by the second polarising beam splitter 211.

Both the first and second beams (having orthogonal polarisation) are, on leaving the second polarising beam splitter 211, directed towards a convergent lens 216. The convergent lens focuses the light beam onto a second mirror 217. The second mirror has a curvature (or associated optical lenses giving an equivalent curvature) determined according to the equation of claim 1, so that the combination of the convergent lens 216 and the second mirror 217 forms a 'cats-eye'.

Following reflection from the second mirror 217, both the first and second beams retrace their paths, and after a second reflection from their respective mirrors (i.e. the first mirror 215, and the target mirror), they exit the second polarising beam splitter in the direction of the laser. On passing through the half-wave ($\lambda/2$) plate 209, the planes of polarisation of both the first and second beams are rotated by a further 45°, and the beams are then split by the non-polarising beam splitter 207.

The transmitted component of the beams passes through a third quarter-wave ($\lambda/4$) plate 230, which introduces a further ($\lambda/4$) path difference between the first and second beams. They then pass through a polariser 222 which is oriented parallel to one of the principal planes (s or p) of polarisation, producing interference which is detected at a first detector 223.

The deflected components of the beams pass into the first polarising beam splitter 205, where the s-polarisation is reflected towards a second detector 224, which detects a second set of interference patterns. Due to the use of the third quarter-wave ($\lambda/4$) plate 230, the two interference patterns do not have the same intensity for a given position of the target mirror. Ideally, for an appropriate adjustment of the orientations of the polariser 222 and the third quarter-wave ($\lambda/4$) plate 230, the two fringe patterns are in 'quadrature', i.e. one is at a peak intensity whilst the other is mid-way between a maximum and minimum. With this arrangement, the two outputs can be used to determine the displacement of the target mirror with a resolution that is much less than one wavelength of the radiation used.

Figure 4:
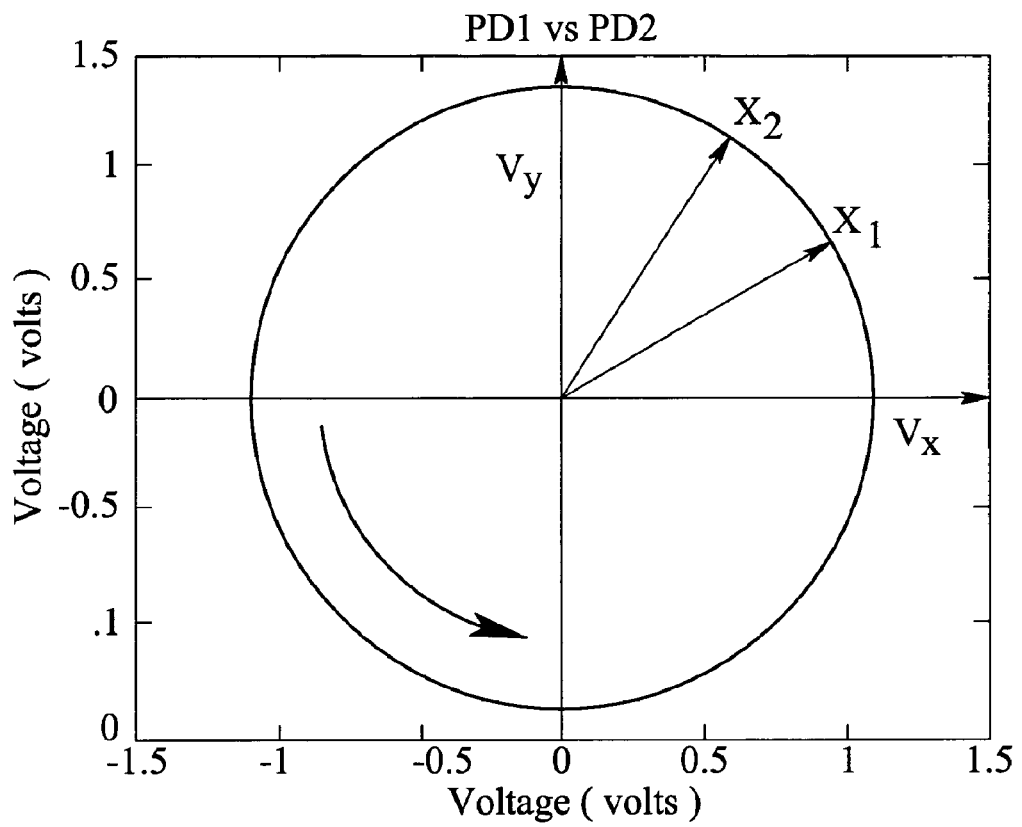
FIG. 4 shows a Lissjous figure produced by plotting the fringe patterns detected by detectors shown in the embodiment of FIG. 3.

This can be seen in FIG. 4 where the intensities of the fringe patterns, as measured by the photodiodes, are plotted against each other. Displacement of the target mirror by a distance $\lambda/4$ will trace out a complete circle or more generally an ellipse which is referred to as a Lissajous figure. The motion of the target mirror can therefore be tracked by successive samples of the two fringe patterns and the addition of the sequence of angular displacements around the circle. The incremental changes in phase can be related to real motion using a simple trigonometrical relation. If the target mirror moves a distance $\Delta x$ between subsequent samples of the photodiode voltages, displacement is provided in terms of the sampled voltages using the following expression:

$$\Delta x = \frac{\lambda}{8\pi}\left\{\arctan\left(\frac{v_{22}-v_{20}}{v_{12}-v_{10}}\right) - \arctan\left(\frac{v_{21}-v_{20}}{v_{11}-v_{10}}\right)\right\}$$

Where $v_{11}$ and $v_{21}$ and $v_{12}$ and $v_{22}$ are the initial and final photodiode voltages respectively, and $v_{10}$ and $v_{20}$ are mean voltages.

It can be seen from this equation that it is necessary to define the mean photodiode voltages so that the centre of the Lissajous figure can be located at the origin (as shown in FIG. 4). This can be achieved in practice by a calibration procedure. However, a more robust method is to use three photodiode outputs that are mutually orthogonal in phase. The mean voltages can then be eliminated by subtracting the photodiode voltages in pairs. It will be understood that an additional photodiode and electronics channel and polarising beamsplitter are required for this, as discussed previously.

A software routine (e.g. HP Vee) may be used to read the fringe voltages in digital form and to perform the conversion to displacement. The sampling speed is limited to a few 100 Hz. A promising approach is to perform the conversion from fringe intensity to displacement using real-time processing. Real-time displacement data can be generated using efficient algorithms implemented on field programmable gate arrays (FPGAs). It is also possible to fit out ellipticity from the Lissajous figure in real-time to eliminate non-linearity. Use of a real-time processor is inexpensive and increases the tracking speed.

The principle of operation of the interferometer, so far described, is that of a homodyne polarising interferometer. It has surprisingly been found that, by using the appropriate parameters for the cat's-eye, the interferometer can be made tilt insensitive over angles of a degree or more. This makes a significant difference to the range of applications that are open to interferometric sensors, as mirrors can now be easily aligned 'by eye' and no specialised mirror mounts are required either in the device itself or by the end user.

For any cat's-eye configuration, there is a nominal working distance, $d_0$, at which the tilt immunity is a maximum. This follows from the known properties of cat's-eye reflectors.

Figure 5:
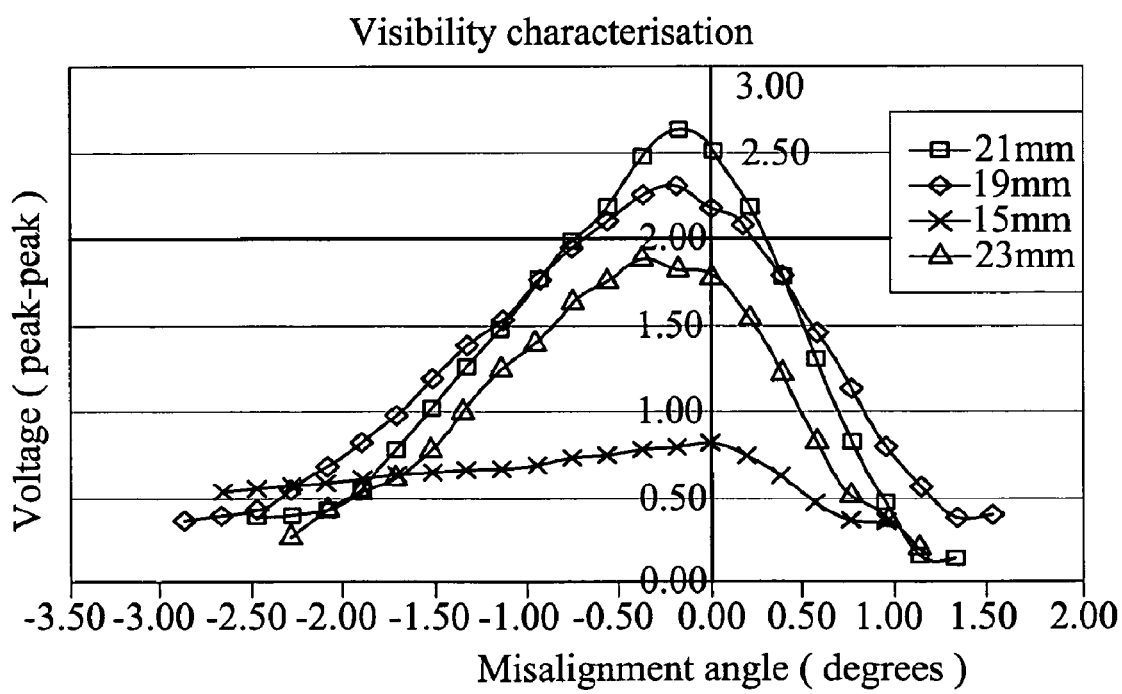
FIG. 5 shows a plot of the Lissjous radii against target mirror tilt for a variety of target mirror locations.

FIG. 5 shows the diameter of the Lissajous pattern as a function of the tilt of the target mirror in the embodiment of FIG. 3, for different values of the distance between the interferometer chassis and the optimum position for the target mirror. It can be seen that, at a working distance of 21 mm (the upper trace), a reduction in the radius of the Lissajous pattern of a factor of two (corresponding to a peak-peak voltage of about 1 V) occurs for mirror tilts of more than about +/−1°. The radius of the fringe pattern remains larger than about 1V for a range of angles of more than 2 degrees for a range of working distances between 19 mm and 23 mm. The tilt sensitivity is asymmetric about the position where the fringe visibility is a maximum and this is probably due to the displacement of the laser beam from the optic axis of the cat's eye lens.

The working range, r, can be defined as the distance over which the Lissajous pattern reduces by 50% for a mirror tilt of +/−1 degree. A conservative estimate of r for the embodiment shown in FIG. 3 would be 2 mm (+/−1 mm about $d_0$). However, it should be noted that the device will operate satisfactorily at larger mirror tilts or working ranges and that the limit to misalignment will be set by the deterioration of signal to noise ratio.

The following comments are expressed in relation to the embodiment shown in FIG. 3. However, it will be appreciated that the comments may also apply to equivalent components in equivalent positions in other embodiments.

The interferometer is subject to systematic uncertainties that limit the accuracy of the measurement. Imperfect optical components yield Lissajous patterns, such as that shown in FIG. 4, that are elliptical rather than circular. In the case of imperfections in the non-polarising beam splitter (207) and the third quarter-wave ($\lambda/4$) plate (230), the ellipticity of the pattern can be corrected by adjusting the orientations of the third quarter-wave plate (230) and the polariser (222). In practice, a polarising beam splitter does not perfectly separate the horizontal and vertical polarisations of the light and hence the polarisation directions of the light travelling along the different arms are not perpendicular to each other. Thus, during the second pass, a small fraction of the light which has sensed the position of the target mirror now senses the position of the reference arm and vice-versa.

In addition imperfections in the first and second quarter-wave ($\lambda/4$) plates (213 and 219) in the reference and target arms can introduce further polarisation mixing. According to initial estimates, the polarisation mixing due to the second polarising beam splitter (211) introduces the largest systematic uncertainty of the order of 1 nm, using low cost components, which can be reduced by using better quality components. These errors are cyclical and so do not affect the portion of the distance measured that is an integer number of fringes and, as such, represent a fixed possible length uncertainty, $\epsilon$, on any measurement of displacement.

The overall size of the optics head is determined by a number of considerations. One prototype of the interferometer measures 46×60×21 mm. We can define the distance between the optimum position of the target mirror and the cat's-eye lens as $d_0'$. The critical design parameter then of the cat's eye is the ratio, $\alpha$, defined as $$\alpha = \frac{d_0'}{f_c}$$

where $f_c$ is the focal length of the cat's-eye lens. The best designs will minimise the space requirement for the cat's-eye whilst maintaining a practical value for $d_0$ and $d_0'$. Spherical aberration of the cat's-eye lens sets a limit to the largest value of $\alpha$. A possible method of reducing the size of the optics head is to employ an expander lens prior to the second polarising beam splitter and by placing the cat's-eye lens between the second polarising beam splitter and the target minor (as shown in the embodiment of FIG. 2). This makes use of the space used by the second polarising beam splitter and limits the focal ratio required of the cat's-eye lens.

An overall scale reduction of the optical head would maintain the angular range of the device at the cost of a reduction in the optimum working distance $d_0$. However this is not possible where the laser beam is not aligned with the optical axis of the cat's-eye. This design results from the need to avoid optical feedback into the laser as mentioned above. The optical components (10 mm beamsplitter cubes and 10 mm diameter lenses are currently used) could be made smaller and comparable with the laser beam diameter if the beam was allowed to be coaxial with the optic axis. This could be achieved by using an optical isolator between the laser and the polarising optics. However, due to the size of such a component, it would be attractive to use a remote fibre-fed laser with an isolator incorporated into the fibre feed. High quality Distributed Feedback (DFB) lasers at telecom wavelengths might be suitable for this purpose. Such a scheme would also alleviate the problem currently experienced in mounting and aligning the laser diode in the optics head. Ultimately scaling will be limited by the size of the laser beam.

The space required by the reference mirror is determined by the need to eliminate drift in the fringe pattern due to changes in the wavelength due to temperature changes. This is discussed below.

The embodiment of FIG. 3 is fabricated using UV curing adhesives to bond the halfwave ($\lambda/2$) plate (209) to the second polarising beam splitter (211), and the quarter-wave ($\lambda/4$) plate (230) to the non-polarising beam splitter (207). The optical components, except for the cat's-eye mirror (217) and the laser collimator, are bonded to a template for ease of alignment. The template and interferometer chassis are fabricated from aluminium alloy.

Figure 6:
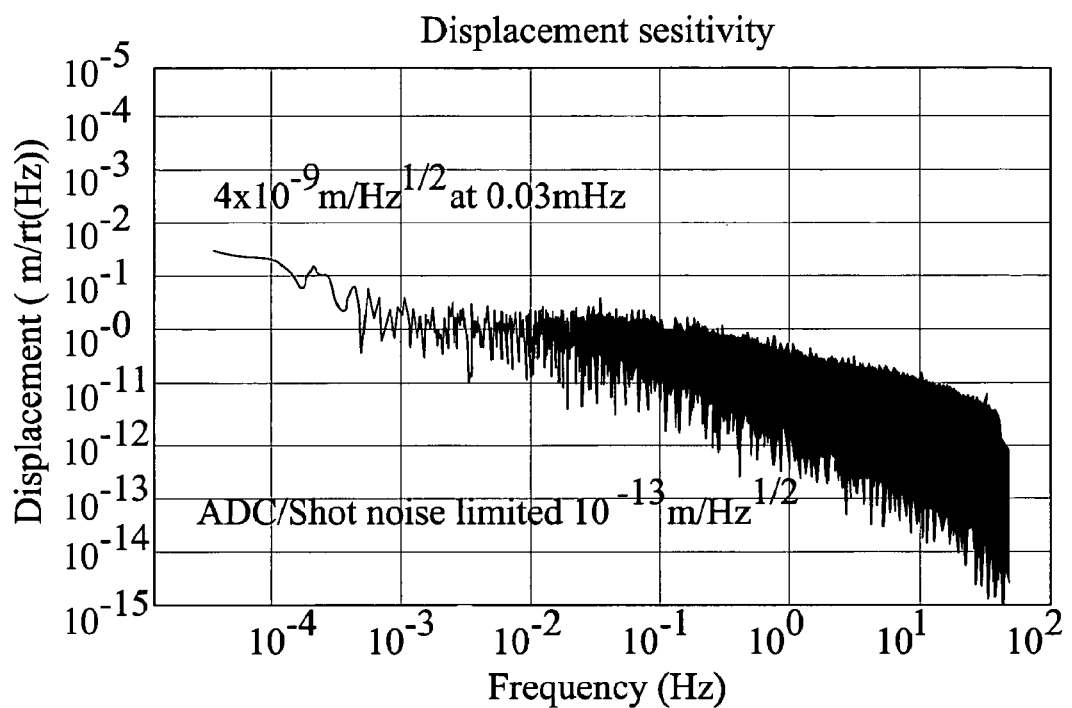
FIG. 6 shows a plot of noise measured in an interferometer of a design similar to that of FIG. 3.

FIG. 6 shows a plot of noise measured in an interferometer of a similar design to that shown in FIG. 3. The laser was temperature controlled and the interferometer was located in a vacuum. A sensitivity of $10^{-13}$ m/Hz$^{1/2}$ at frequencies above 40 Hz was observed, which is limited by the resolution of the analogue to digital converter (adc) quantisation noise and the intrinsic shot noise corresponding to the optical power being used (approximately 20 µW). At lower frequencies the sensitivity is reduced to 4 nm/Hz$^{1/2}$. This loss in sensitivity is due to the presence of 1/f noise in the preamplifiers. The important specifications of the electronics are the maximum and minimum frequency, $v_{max}$ and $v_{min}$, at which we specify the displacement sensitivity at these frequencies $\Delta x(v)$.

Whilst there is probably little motivation to make physical measurements at the ultimate sensitivity of the interferometer at frequencies about 10 kHz or so, there is a need to keep track of the evolution of the fringe pattern at high speeds. If the target mirror moves at a speed such that the Lissajous pattern is sampled at less that 3 times per revolution, the mirrors position cannot be accurately tracked. However, increasing the bandwidth of the electronics increases the level of electronic noise and limits the displacement sensitivity across the working bandwidth. There is a trade-off between broadband and low frequency sensitivity which is determined by the choice of preamplifier. This also has to be matched to the adc quantisation noise. Nevertheless, it may be possible to manufacture a front-end sampling electronics that will enable a displacement sensitivity of pm/Hz$^{1/2}$ between 10 mHz and 100 kHz. The preamplifier used to generate FIG. 6 was a high performance bi-fet amplifier that is not optimised for low frequency performance. If the sampling frequency is $f_s$, the maximum tracking speed $s_{max}$ is approximately:

$$s_{max} \approx f_s \frac{\lambda}{12}.$$

With a sampling frequency of 200 kHz, $s_{max}$ corresponds to 1.4 cm s$^{-1}$ for a wavelength of 850 nm. It would be possible to provide low resolution readout by simply counting fringes at a higher frequency: for example, counting at 4 MHz would enable the mirror to be tracked at speeds of up to 30 cm s$^{-1}$ but with a displacement sensitivity of $\lambda/16$.

Another possibility is to use 'absolute' interferometry where the absolute difference in the two armlengths can be determined by deliberate modulation of the wavelength of the laser. Using this method it is no longer necessary to track the incremental changes in the position of the proof mass and the position can be measured as and when it is needed. However, this approach is less sensitive by a factor of $\delta\lambda/\lambda$ than the incremental approach. Here $\delta\lambda$ is the depth of modulation of the laser wavelength which is typically ~2 nm. This approach may be useful in trying to limit the effect of low frequency drift in the laser wavelength at low frequency.

When estimating the displacement sensitivity at the low end of the frequency band we must consider the temperature stability of the interferometer and its environment. If the laser is not temperature controlled inequality in the arms of the interferometer results in there being an error in the measured phase of the order:

$$\delta\phi_L = -\frac{8\pi \Delta l}{\lambda} \frac{\delta\lambda}{\lambda}$$

where $\Delta l$ is the armlength asymmetry and $\delta\lambda$ is a wavelength shift. If the wavelength shift is due to a change in temperature $\delta T$ where $\delta\lambda = \beta \delta T$, the displacement error will be:

$$\delta x_T = -\Delta l \frac{\beta \Delta T}{\lambda}.$$

A typical value for $\beta$ is 0.06 nm/K for 850 nm VCSELs. In order to assess the importance of the fluctuations in the laser wavelength it is necessary to make some assumptions about the thermal environment of the device and its thermal properties. If it is assumed that the laser is heat sunk to the baseplate and its 'thermal' dimension is 5 cm, we can use the thermal diffusivity to show that only temperature variations with frequencies below about $10^{-2}$ Hz will substantially affect the temperature of the laser. We will assume a linear thermal drift of $\Delta T$ occurs over a time interval of 1000 s. The resulting amplitude spectral density of temperature fluctuations can be calculated to be:

$$\Delta T \approx 7 \frac{\Delta \dot{T}}{f} \text{K/Hz}^{1/2}.$$

Assuming a typical laboratory environment we might expect a temperature drift of a few Kelvin over a working day whereas, if the laser is temperature stabilised, this could be reduced by a factor of a thousand or so. A 1 mm armlength asymmetry is also assumed. We expect an equivalent noise in displacement of about 5 nm/Hz$^{1/2}$ in a typical lab environment and for a stabilised laser a value of about 2 pm/Hz$^{1/2}$.

A typical value for the sensitivity of the laser wavelength to the drive current is 0.3 nm/mA. The specification on the stability of the laser current source corresponding to the typical laboratory environment and the temperature stabilised case are about 10 µA/Hz$^{1/2}$ and 5 nA/Hz$^{1/2}$, respectively at 0.01 Hz. These noise figures are not difficult to achieve.

Differential thermal expansion of the reference and target arms will also limit the low frequency performance. If, for example, both arms were constructed of aluminium (thermal expansion coefficient of 23 ppm/K) and located in the typical thermal environment described above, the displacement noise would be about 2 nm/Hz$^{1/2}$ at 10 mHz assuming an armlength asymmetry of 1 mm. Another possibility is to use a ZERODUR (a glass ceramic manufactured by Schott AG), ULE (manufactured by Corning Specialty Materials) or carbon-fibre reinforced plastic baseplate for the reference arm. If we assume a thermal expansion coefficient of ULE (30 ppb), an armlength difference of 20 mm and a thermal environment with a temperature drift of 0.1 K over 8 hours, this results in a displacement noise of 1 pm/Hz$^{1/2}$.

Figure 7:
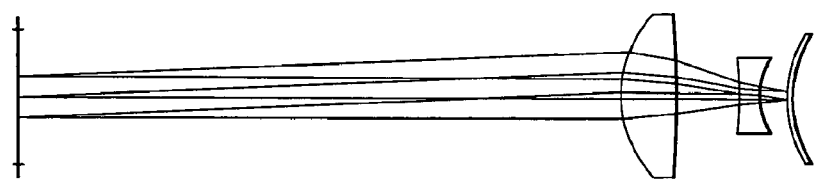
FIG. 7 shows a schematic diagram of a diffraction-limited cat's-eye retroreflector.

Referring to FIG. 7, a schematic drawing of a diffraction-limited cat's-eye retroreflector is shown with a plane in the position at which the target mirror should be placed in order to obtain the maximum tolerance to tilt. The distance from the plane to the first lens is 45.26 mm, and the overall length of the retroreflector is 12.75 mm. The retroreflector contains one aspheric surface, with the specifications of a particular plano-convex lens commercially available from Asphericon GmbH. The specifications of the components are listed in Table 1. The aspheric surface is indicated with an asterisk.

TABLE 1

Components of the retroreflector

| Surface number | Radius of curvature (mm) | Thickness after surface (mm) | Glass type |
| --- | --- | --- | --- |
| 2, 11 | 120.00* | 4.25 | S-LAH64 |
| 3, 10 | −100.00 | 4.69 | n = 1 |
| 4, 9 | −30.00 | 1.50 | SF15 |
| 5, 8 | 5.24 | 2.31 | n = 1 |
| 6 | 10 | — | Mirror |

Figure 8:
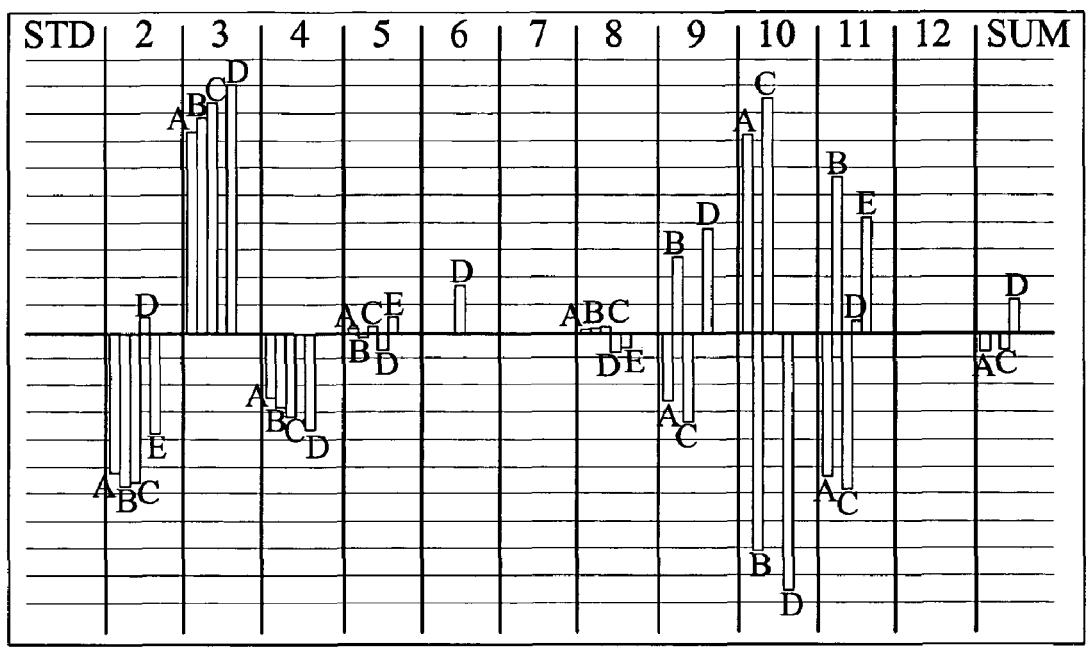
FIG. 8 shows a graphical representation of the contributions of each surface to each type of Seidel aberrations in the retroreflector of FIG. 7.

Referring to FIG. 8, the contributions of each surface to each type of Seidel aberrations (in the order listed) is quantified. One of the first features that stands out is the behaviour of coma and distortion. The contributions of each surface when the rays propagate into the system towards the mirror nearly cancel out with the contributions of the same surfaces when the beams propagate out of the system. This is a consequence of the cat's eye being almost a symmetric system, since coma and distortion depend on the odd powers of the position of the beam as it traverses the surfaces. The curved mirror, however, breaks the symmetry, but the cancellation of coma and distortion is still satisfactory.

The cancellation of spherical aberration and astigmatism is accomplished in each pass of the beams by means of the aspheric surface and the two spherical surfaces that follow. In particular, the contributions from the back of the first lens cancel the contributions of the aspheric surface and the first surface of the second lens. The second surface of the second lens does not contribute as much to the overall departure from the paraxial approximation since the angle of incidence of the rays are not too large. The convex mirror contributes with some field curvature.

Figure 9:
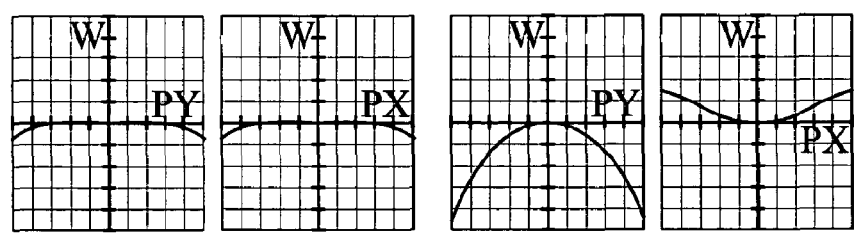
FIG. 9 shows a plot of the optical path difference of the real wavefront with respect to the aberration free wavefront in the tangential and sagittal planes for the retroreflector of FIG. 7.

The plots in FIG. 9 quantify the optical path difference of the real wavefront with respect to the aberration free wavefront in the tangential and sagittal planes. The optical path difference introduced by the aberrations is always less than a quarter of a wavelength of light. Thus, according to the Rayleigh's criterion, the system is not impaired by aberrations.

Figure 10:
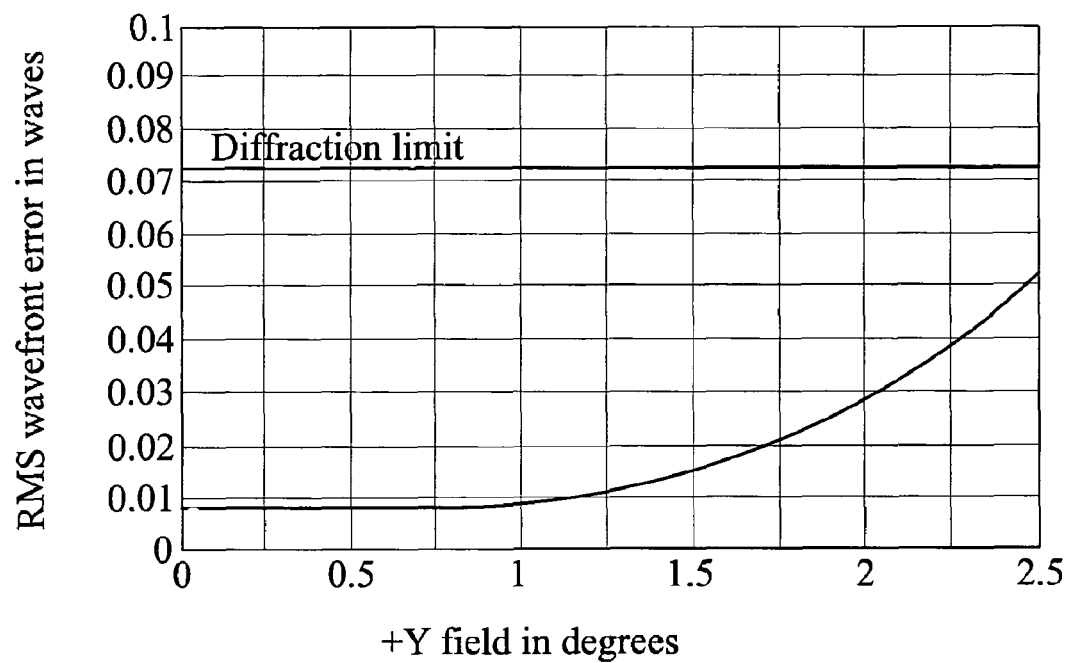
FIG. 10 shows the RMS wavefront error introduced by the aberrations as a function of the angle of incidence, for the retroreflector of FIG. 7.

Referring to FIG. 10, it can be seen that the contributions from the aberrations are below the diffraction limit. The diffraction limit in such a plot shows that the angular range of the cat's eye is at least ±2.5°.

The invention claimed is:

1. An interferometer comprising:
a source of a light beam;
a first beam splitter for splitting the light beam from the source into at least first and second beams;
a first reflector positioned in the path of the first light beam;
a second reflector, comprising a convergent lens and a mirror, positioned in the path of the second light beam following reflection from a target; and
at least one detector for detecting fringes formed by interference of the first and second light beams following reflection from the first and second reflectors respectively;
characterised in that the mirror of the second reflector has a radius of curvature R within 10% of the value determined using the formula:

$$R = \frac{\left(\sum_i \frac{l_i}{n_i}\right)^2}{\sum_i \frac{l_i}{n_i} - \sum_k \frac{l_k}{n_k}}$$

and the focal length f of the convergent lens is within 10% of the value determined using the formula:

$$f = \sum_i \frac{l_i}{n_i}$$

where i are the segments of optical path, each of length l, and having refractive index $n_i$, between the convergent lens and the mirror, and k are the segments of the intended optical path, each of length $l_k$ and having refractive index $n_k$, between the convergent lens and the target, in use.

2. An interferometer as claimed in claim 1, wherein the radius R of the mirror of the second reflector is within 5% of the value calculated using the formula of claim 1.

3. An interferometer as claimed in claim 1, wherein the focal length f of the convergent lens of the second reflector is within 5% of the value calculated using the formula of claim 1.

4. An interferometer as claimed in claim 1, wherein the position of the second reflector is such that the optical path of the second light beam includes a second reflection from the target, following reflect ion from the second reflector.

5. An interferometer as claimed in claim 1, wherein the second reflector is additionally positioned in the path of the first light beam, following reflection from the first reflector.

6. An interferometer as claimed in claim 5, wherein the position of the second reflector is such that the optical path of the first light beam includes a second reflection from the first reflector, following reflection from the second reflector.

7. An interferometer as claimed in claim 1, wherein the optical path of the second light beam passes through the first beam splitter following reflection from the target and before reflection from the mirror of the second reflector, and the convergent lens of the second reflector is positioned between the first beam splitter and the mirror of the second reflector.

8. An interferometer as claimed in claim 1, wherein the optical paths of both the first and second light beams pass through the first beam splitter following reflection from the first reflector and target respectively, and before reflection from the mirror of the second reflector, the convergent lens of the second reflector in the path of the second light beam being positioned between the first beam splitter and the target, the second reflector further comprising a second convergent lens positioned in the path of the first light beam between the first beam splitter and the first reflector, and the interferometer further comprising a divergent lens positioned between the light source and the first beam splitter.

9. An interferometer as claimed in claim 1, wherein the first beam splitter is a polarising beam splitter such that the first and second light beams have complementary polarisations.

10. An interferometer as claimed in claim 1, wherein the interferometer comprises at least two detectors for detecting fringes formed by interference of the first and second light beams following reflection from the first and second reflectors respectively.

11. An interferometer as claimed in claim 10, further comprising a quarter-wave ($\lambda/4$) plate present in the optical pathway to at least one of the at least two detectors, wherein the optical pathway to at least one other of the at least two detectors does not include such a quarter-wave ($\lambda/4$) plate.

12. An interferometer as claimed in claim 1, further comprising a reference detector for measurement of the intensity of the light beam from the source before passing through the first beam splitter.

13. An interferometer as claimed in claim 1, wherein the first reflector comprises a plane mirror.

* * * * *